US00RE33838E

United States Patent [19]

Jaisle et al.

[11] E Patent Number: Re. 33,838

[45] Reissued Date of Patent: Mar. 3, 1992

[54] DECORATIVE LAMINATES

[75] Inventors: Richard F. Jaisle, Batesville, Ind.; Henry C. Mollmann, Forest Porda, Ohio; Martha J. A. Stegbauer, Macedon; James H. Burgess, Lewiston, both of N.Y.

[73] Assignee: Formica Corporation, Wayne, N.J.

[21] Appl. No.: 296,427

[22] Filed: Jan. 12, 1989

Related U.S. Patent Documents

Reissue of:

[64] Patent No.: 4,636,443
Issued: Jan. 13, 1987
Appl. No.: 674,219
Filed: Nov. 23, 1984

[51] Int. Cl.[5] ..... B32B 27/10

[52] U.S. Cl. ..... 428/481; 428/503; 428/530; 428/537.5; 528/303; 528/306

[58] Field of Search ..... 428/481, 503, 530, 537.5; 528/303, 306

[56] References Cited

U.S. PATENT DOCUMENTS

| | | | |
|---|---|---|---|
| 4,370,386 | 1/1983 | Uekit et al. | 428/530 |
| 4,391,833 | 7/1983 | Self et al. | 428/481 |
| 4,424,261 | 1/1984 | Keeling et al. | 428/530 |
| 4,473,613 | 9/1984 | Jaisle et al. | 428/530 |
| 4,530,883 | 7/1985 | Knapp et al. | 428/530 |
| 4,741,968 | 5/1988 | Dion et al. . | |

FOREIGN PATENT DOCUMENTS

| | | | |
|---|---|---|---|
| 2537409 | 3/1977 | Fed. Rep. of Germany | 428/481 |
| 2806972 | 8/1979 | Fed. Rep. of Germany | 428/481 |
| 960055 | 5/1962 | United Kingdom . | |
| 1069203 | 11/1963 | United Kingdom . | |

*Primary Examiner*—Edith L. Buffalow
*Attorney, Agent, or Firm*—Keck, Mahin & Cate

[57] ABSTRACT

Polyester resins are disclosed as the impregnant in the core sheets of heat and pressure consolidated laminates, especially decorative laminates having a core of a color complementing that of the decor sheet, and more especially those decorative laminates of unusual thickness.

9 Claims, No Drawings

DECORATIVE LAMINATES

Matter enclosed in heavy brackets [ ] appears in the original patent but forms no part of this reissue specification; matter printed in italics indicates the additions made by reissue.

BACKGROUND OF THE INVENTION

The production of high pressure, decorative laminates from thermosetting resin impregnated, cellulosic sheets is well known in the art. These laminates are generally manufactured from a core layer, a decorative layer and optionally, an overlay layer. The core layer usually comprises from 2-12 sheets of phenolic resin impregnated kraft paper, the decorative layer usually comprises a melamine/formaldehyde resin impregnated, α-cellulose-containing pigmented or printed paper sheet and the overlay layer usually comprises a melamine-formaldehyde resin impregnated, α-cellulose-containing paper sheet which is transparent when the three layers are heat and pressure consolidated into the ultimate laminate. The thickness of these laminates normally ranges from about 1/16 inch to ⅜ inch although thicker higher pressure laminates have been produced i.e. up to about ¾-1 inch. Difficulties in the manufacture of such thick, high pressure, laminates, such as edge crazing under ambient dry conditions or at high temperature, have, however, mitigated against the production thereof such that these laminates constitute a very small percentage of the overall laminate market.

Attempts to produce thicker articles by gluing thin, high pressure, decorative laminates to one another have not proven successful because of the unattractive dark edge of the thin, laminates which is attributable to the phenolic resin in the core sheets and which is transferred to the thicker article. Additionally, the use of most commercially available adhesives to glue thin, high pressure, decorative laminates to one another also imparts a distinct color to the edges of the thicker articles at the points where the thin, high pressure, decorative laminates are cemented together.

A recent development in the laminate industry has resulted in the production of thin, high pressure, decorative laminates having an edge color consistent with the color of the decorative sheet. This result is accomplished by using pigmented kraft paper sheets in the core of the same color as that of the pigmented decorative sheet. The phenolic resin in the core is replaced by a non-darkening resin thereby eliminating the undesirable dark edge, see U.S. Pat. No. 4,424,261 and pending U.S. application, Ser. No. 650,559 filed Sept. 13, 1984 now U.S. Pat. No. 4,530,883, hereby incorporated herein by reference. The production of thicker, high pressure, decorative laminates containing these newer, colored sheets also suffers from the same difficulties in production as the thicker, darker edge, high pressure, decorative laminates i.e. incomplete curing of the resin, edge crazing, etc. Accordingly, if an article could be produced which does not have the tendency to craze at its edges upon subjection to high temperature and/or ambient dryness, a step forward in the art would be achieved.

SUMMARY OF THE INVENTION

It has now been found that thick articles which do not suffer from the deficiencies normally connected with thick articles produced from an assembly of resin impregnated sheets (i.e. they are free from edge crazing), can be produced by forming an assembly of polyester resin impregnated core sheets and a melamine/formaldehyde thermosetting resin impregnated decorative sheet, sufficient core sheets being used to achieve the desired thickness e.g. 1/32-1½ inches. The assembly, when heat and pressure consolidated, results in the formation of a thick article whose edge exhibits the color of the edges of the individual core sheets from which the thick article is produced. If a plurality of pigmented core sheets all of the same color, e.g. white, are superimposed atop a second plurality of pigmented core sheets of a second color e.g. blue, the edge of the resultant thick article will be white and blue. A striped effect in the thick article can be achieved by utilizing many series of pluralities of different colored core sheets. It is indeed surprising that the polyester impregnated core sheets used to produce the novel decorative articles of the present invention are capable of bonding to the melamine/formaldehyde resin impregnated decor sheet because it was previously believed that such sheets would not consolidate with other under the conditions of heat and pressure used to produce such articles.

A further feature of the process of the present invention is the absence of a need to cool the laminating press before the heat and pressure consolidated laminate can be removed therefrom. Conventional laminate production requires that the press be cooled to about ambient temperature under pressure in order that the properties of the resultant laminate conform to the standards prescribed therefor. However, the laminates of the present invention exhibit these desired properties if the press is opened hot and the laminate is removed immediately. Thus, a savings of time and energy is realized.

DESCRIPTION OF THE INVENTION INCLUDING PREFERRED EMBODIMENTS

The present invention is directed to a method for the production of a decorative article, especially one having a thickness ranging from about 1/32 inch preferably ⅛ inch, to about 1½ inches or more, which comprises forming a laminate assembly of, in superimposed relationship, a plurality of polyester resin impregnated paper core sheets and a melamine/formaldehyde resin impregnated decor sheet, wherein the polyester resin has a molecular weight ranging from about 1-4 million, contains a peroxide catalyst and is colorless, and heat and pressure consolidating the resultant assembly.

The present invention relates to decorative articles of manufacture comprising (1) a core comprising a plurality of polyester resin impregnated paper sheets and (2) a melamine-formaldehyde resin impregnated decor sheet, wherein said polyester resin is as defined above.

Any polyester resin conforming to the limitations expressed above may be used to impregnate the core sheets used to produce the novel articles of the present invention. These polyester resins are generally well known in the art and are normally unsaturated polyesters produced from such acids and anhydrides as isophthalic anhydride, oleic acid, adipic acid, maleic anhydride and the like, and such polyhydroxy alcohols as ethylene glycol, propylene glycol, 1,3-propanediol, 1,2-butanediol, 1,4-butanediol, glycerol, pinacol, 1,2-cyclopentanediol and the like. Such monomers as styrene, vinyl toluene, diallyl phthalate, vinyl acetate, methyl methacrylate and the like may be used in conjuction with alcohols and acids or anhydrides mentioned above.

The polyester resin per se is colorless, but may be pigmented in any color, if desired. It contains a peroxide catalyst such as t-butyl perbenzoate peroxide in order to assure complete curing thereof under the conditions of heat and pressure consolidation. The molecular weight of the resin should range from about 1–4 million, preferably about 3 million and is generally employed as a solution in any appropriate solvent such as acetone.

The polyester resin is used to impregnate cellulosic paper sheets and the sheets are then employed as the core in the production of the instant decorative articles, the polyester resin replacing the phenolic resin conventionally used in the core sheets of such articles.

The core layer of such laminates is usually made up of a plurality of paper sheets, that is, 2–100, or more. The core sheets are usually constructed of kraft paper, which can be extensible or non-extensible or used as a combination of such sheets. The kraft sheets can be unbleached kraft, bleached kraft, pigmented kraft, pigmented bleached kraft, and so forth; sheets produced from other known pulp furnishings i.e. cotton, rayon etc. may also be used in the formation of articles in accordance with the present invention.

The core sheets are preferably pigmented in a color so as to conform to the color of the decorative sheet so that when the articles are cut or trimmed to size, the edge appears of a color complementary to the color of the articles' surface resulting from the decor sheet. A series of pigmented core sheets of one color may also be positioned atop a second series of core sheets pigmented in a second color to thereby produce a multi-colored edged article. The properties of the resultant articles meet accepted and required NEMA and ISO standards and when exposed to high temperature or ambient dryness do not exhibit deleterious crazing on their edges. When exact matches to the surface color are required, the core sheets may be paper comprised of the same cellulosic furnish and pigments as the decor sheet and, as necessary, contain a high amount of alpha-cellulose.

The polyester resin may be used to impregnate the cellulosic paper core sheets of the decorative articles produced in accordance with the present invention in an amount ranging from about 25% to about 60%, by weight, based on the weight of the impregnated sheet, preferably, about 30–45%.

Any melamine-formaldehyde resin known to be useful for the production of decorative laminates may be used to impregnate the decor sheet or sheets of the laminates of the present invention. They are impregnated into the decor sheets in standard amounts i.e. about 25–55%, by weight, based on the weight of the impregnated sheet.

The novel decorative articles of the present invention range in thickness from about 1/32" to 1½" or more and may be used as tops for vanities, counters, tables and the like.

The following examples are set forth for purposes of illustration only and are not to be construed as limitations on the present invention as set forth in the appended claims. All parts and percentages are by weight unless otherwise specified.

EXAMPLE 1

Three rolls of ninety-seven pound/3000 $ft^2$ basis weight bleached kraft paper are each individually pigmented red, white and blue with appropriate pigments and saturated with a polyester resin produced from 1 mole of isophthalic anhydride, 1 mole of maleic anhydride and 2.2 moles of propylene glycol. The resin has a molecular weight of about 3–4 million and contains t-butyl perbenzoate peroxide as a catalyst. The paper is impregnated to a 35% Rb resin level. The rolls are then dried and cut into 4'×10' sheets.

Thirty-two sheets of the white pigmented paper (as a mass) are then placed between thirty-three sheets of the red pigmented paper (as a mass) and thirty-three sheets of the blue pigmented paper (as a mass). A sheet of blue pigmented alpha-cellulose paper which is impregnated with melamine/formaldehyde resin is then placed atop the blue polyester resin impregnated sheets and a sheet of red pigmented alpha-cellulose paper which is impregnated with the same melamine/formaldehyde resin is placed atop the red polyester resin impregnated sheets. The resultant assembly is then heat and pressure consolidated at 140° C. for 30 minutes. The press is then allowed to cool to ambient temperature, opened and the resultant article recovered. The article is about 11/16" in thickness, blue on one side, red on the other and red, white and blue at its edges.

The article exhibits no edge crazing after 20 hours at 80° C.

EXAMPLE 2

The procedure of Example 1 is again followed except that the 33 sheets of white, pigmented paper are reduced to 3 sheets, and each of the 33 sheets of blue and red pigmented paper are eliminated. The melamine/formaldehyde resin impregnated, alpha-cellulose sheets are both white. The resultant laminate is about 1/32 inch in thickness and completely white throughout.

EXAMPLES 3–5

Again following the procedure of Example 1, excellent laminates are produced when the polyester resin is replaced by the following polyester resins:

(3) adipic acid/propylene glycol/styrene of 2.5 million molecular weight.

(4) isophthalic anhydride/ethylene glycol/propylene glycol/methylmethacylate of 2–3 million molecular weight.

(5) Maleic anhydride/phthalic anhydride/1,4-butanediol/styrene having a molecular weight of 3.75 million.

EXAMPLE 6

The procedure of Example 1 is again followed except that the press is not allowed to cool to ambient pressure before it is opened and the article recovered. Again, no edge crazing is exhibited by the article after 20 hours at 80° C. All other properties remain equivalent.

We claim:

1. A heat and pressure consolidated laminate with superior edge crazing properties comprising:

(1) a core comprising a plurality of polymerized polyester resin impregnated paper sheets, and, (2) one or more polymerized melamine/formaldehyde resin impregnated decor outer sheet(s) bonded thereto wherein said core sheet(s) are impregnated with a polymerized colorless polyester resin [which has a molecular weight ranging from about 1–4 million].

2. A laminate according to claim 1 wherein said decor sheet and said core sheets are pigmented in the same color.

3. A laminate according to claim 1 wherein said core sheets are kraft paper sheets.

4. A laminate according to claim 3 wherein all of said core sheets are pigmented in the same color.

5. A laminate according to claim 3 wherein said core sheets are pigmented in a plurality of colors.

6. A laminate according to claim 1 wherein the polyester resin prior to polymerization in the laminate is a copolymer of isophthalic anhydride, maleic anhydride and propylene glycol in mole ratios of about 1:1 2.2, respectively.

7. A laminate according to claim 1 wherein the polyester resin prior to polymerization in the laminate is a copolymer of adipic acid, propylene glycol and styrene.

8. A laminate according to claim 1 wherein the polyester resin prior to polymerization in the laminate is a copolymer of maleic anhydride, phthalic anhydride, 1,4-butanediol and styrene.

9. A laminate according to claim 1 wherein the polyester resin is impregnated into the core sheets in an amount of from about 25% to 60% by weight thereof.

* * * * *